United States Patent
Milner et al.

(10) Patent No.: US 6,912,312 B1
(45) Date of Patent: Jun. 28, 2005

(54) CREDIT CARD VERIFICATION SYSTEM AND METHOD

(76) Inventors: Moshe Milner, 22 Hayarden Street, Shoam (IL), 73142; David M. Makover, 13 Hamishmar Haezrahi Street, Tel-Aviv (IL), 69697

( * ) Notice: Subject to any disclaimer, the term of this patent is extended or adjusted under 35 U.S.C. 154(b) by 0 days.

(21) Appl. No.: 09/868,957

(22) PCT Filed: Dec. 16, 1999

(86) PCT No.: PCT/IL99/00689
§ 371 (c)(1), (2), (4) Date: Jul. 26, 2001

(87) PCT Pub. No.: WO00/39759
PCT Pub. Date: Jul. 6, 2000

(30) Foreign Application Priority Data

Dec. 24, 1998 (IL) .................................................. 127727

(51) Int. Cl.[7] .......................... G06K 9/68; G05B 19/00
(52) U.S. Cl. ........................ 382/218; 382/118; 340/5.83
(58) Field of Search ................................ 382/115, 118, 382/124, 181, 209, 218, 311; 340/5.8, 5.81, 5.82, 5.83; 713/186; 902/5

(56) References Cited

U.S. PATENT DOCUMENTS

| | | | | |
|---|---|---|---|---|
| 4,821,118 A | * | 4/1989 | Lafreniere | 348/156 |
| 4,993,068 A | * | 2/1991 | Piosenka et al. | 713/186 |
| 5,095,196 A | | 3/1992 | Miyata | 235/382 |
| 5,321,751 A | * | 6/1994 | Ray et al. | 713/186 |
| 5,432,864 A | * | 7/1995 | Lu et al. | 382/118 |
| 5,826,245 A | * | 10/1998 | Sandberg-Diment | 705/44 |
| 6,040,783 A | * | 3/2000 | Houvener et al. | 340/5.53 |
| 6,202,055 B1 | * | 3/2001 | Houvener et al. | 705/44 |
| 6,270,011 B1 | * | 8/2001 | Gottfried | 235/379 |

FOREIGN PATENT DOCUMENTS

| | | |
|---|---|---|
| EP | 0590224 A2 | 4/1994 |
| EP | 0744715 A2 | 11/1996 |
| WO | 93 11511 | 6/1993 |
| WO | 96 06409 A | 2/1996 |

OTHER PUBLICATIONS

"Facial Image Data on Credit Card for Identification," IBM Technical Disclosure Bulletin, vol. 30, No. 8, Jan. 1988, p. 366.

* cited by examiner

*Primary Examiner*—Daniel Miriam
(74) *Attorney, Agent, or Firm*—Schneck & Schneck; Thomas Schneck

(57) ABSTRACT

The invention provides a credit card verification system, including a credit card company data storage and communication unit (4) for recording and storing data concerning authorized credit card holders, including an electronically reproducible image of each credit card holder, means (6) for introducing the image into the company data storage unit, and at least one remotely positioned credit card reader (10) and image display meants (12) communicating with the company data storage unit, for selectively retrieving data from the storage unit to be displayed on the image display means, to be viewed and approved by the person providing sales services. The invention also provides a method for verifying the identity of a credit card holder effecting a tansaction and a method enabling credit companies to monitor and verify credit card holder identity when a payment transaction is performed at a sales terminal.

4 Claims, 2 Drawing Sheets

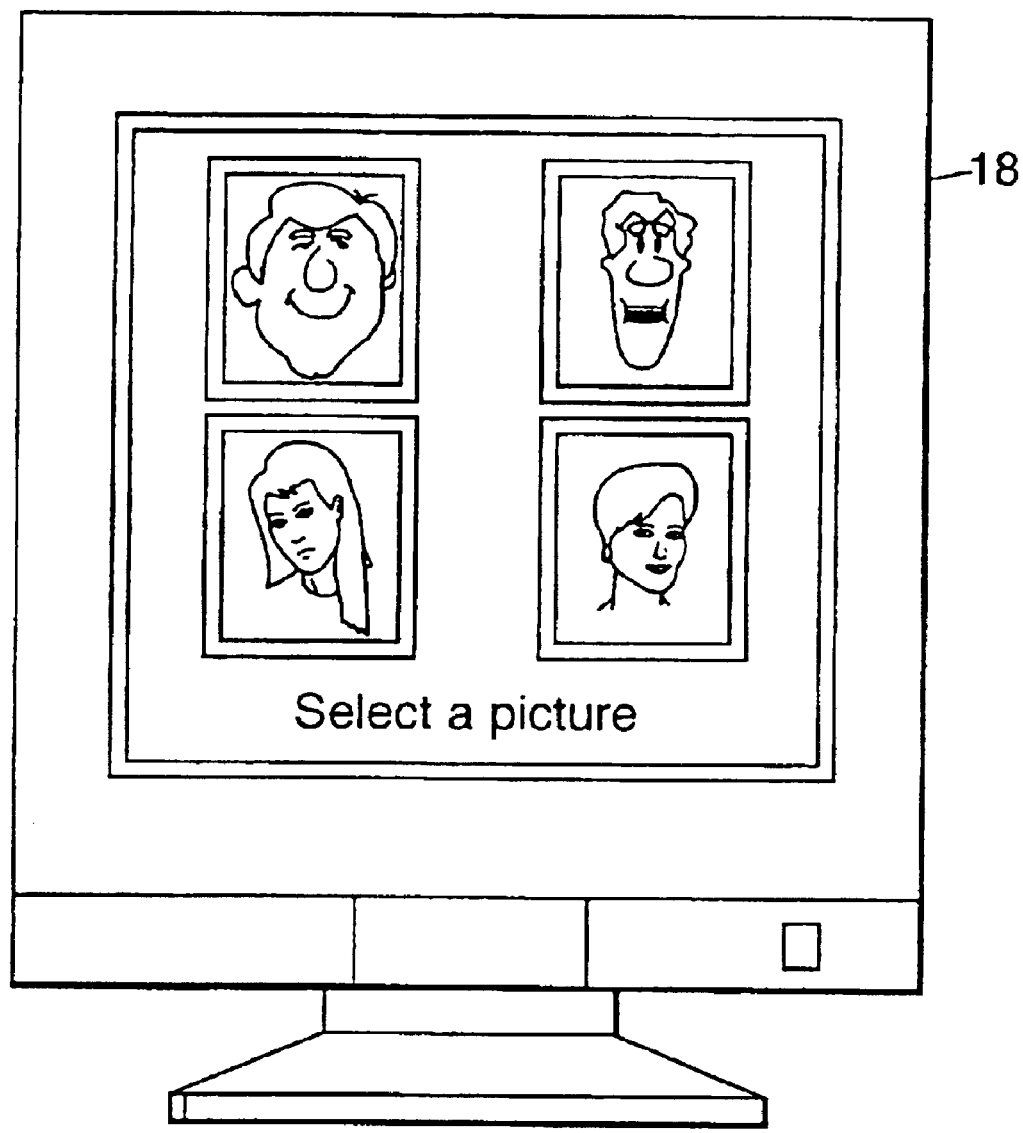

CREDIT CARD VERIFICATION SYSTEM AND METHOD

FIELD OF THE INVENTION

The present invention relates to a credit card verification system and method.

BACKGROUND OF THE INVENTION

Today, it is impossible to know whether a credit card presented for payment is in truth the credit card of the particular customer who is effecting the purchase; in other words, that the person presenting the card is its rightful owner.

At the time of effecting a transaction by means of a credit card at locations where a magnetic card reader is used, the card is passed through the reader and its details are communicated to the credit company. The credit company checks whether the card is in force, if the card was cancelled, if the card owner's bank approves the transaction at the indicated cost, and sometimes also other reasonable details of the purchase. This investigation does not provide a solution for cases in which the credit card is stolen, to the extent that the credit company does not yet know that the card was stolen. A credit company will approve a transaction using a stolen credit card, when it has not yet been informed that the card was stolen. In addition, credit cards are available upon which the owner's picture is printed; however, these cards are not protected, they can be counterfeited, and the cost of producing them is high.

The limited "self-defense" means of the credit company is usually considered to be the visual check of the salesperson collecting the payment, verifying that the signature of the purchaser conforms with the owner's signature sample on the card. Such verification is very limited, as it relies upon the motivation of the salesperson and enables no performance supervisory control by the credit company.

U.S. Pat. No. 3,569,619 discloses a verification system using coded identifying and storage means having a credit card company data storage and communication unit for recording and storing data concerning authorized credit card holders, including an electronically reproducible image for each credit card holder. Means are provided for introducing the image into the company's data storage unit. At least one remotely positioned credit card reader and image display means is also provided, communicating with the company data storage unit, for selectively retrieving data from the storage unit to be displayed on the image display means and to be viewed and approved by the sales person.

U.S. Pat. No. 5,095,196 is directed to a security system having imaging functions, constituting an access control system for examining a passer having an ID card including a photograph and key data for searching registered data of the passer.

WO 93/11511 also discloses personal identification devices and access control systems.

SUMMARY OF THE INVENTION

It is therefore a broad object of the present invention to overcome the above-described disadvantages of the use of credit cards and to provide a credit card verification method and system.

It is a further object of the present invention to provide a performance supervisory control program for a credit card system, operated at the payment location, which will force the salesperson to perform proper comparison of card holder data to the customer present at the payment location.

In order to achieve the above objectives, the invention provides a method for verifying the identity of a credit card holder effecting a transaction, comprising introducing data and an image relating to each authorized credit card holder into a credit card company's data storage and communication unit or image display means; providing at least one credit card reader and a camera at a purchasing location for effecting communication with said data storage unit or image display means; operating said credit card reader and camera to effect display of the credit card holder's image and data on the company's image display means; comparing the displayed image with the stored image of the card holder, and if the images are identical or similar and credit is approved, transmitting a signal to said purchasing location to complete the transaction.

The invention further provides a method enabling credit companies to monitor and verify credit card holder identity when a payment transaction is performed at a sales terminal, said method comprising displaying multiple images of identification data, at least one of which is true; prompting the payment terminal operator to select the correct data; determining whether the selected data is correct, and either completing or denying the transaction.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a schematic illustration of a first embodiment of a credit card verification system according to the present invention;

FIG. 2 is a schematic illustration of a second embodiment of a credit card verification system according to the present invention, and FIG. 3 is an illustration of a data verification display in the sales terminal of a payment location.

DETAILED DESCRIPTION OF PREFERRED EMBODIMENTS

Figure 1:
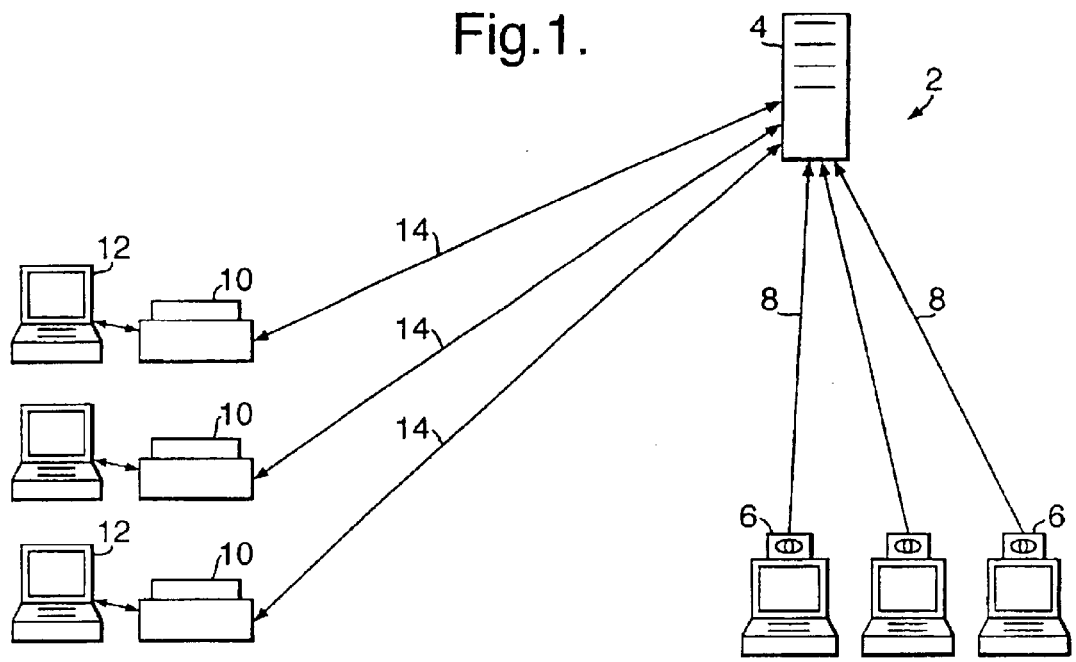

In the preferred embodiment of FIG. 1, there is shown a credit card verification system 2 including a credit card company data storage and communication unit 4 for recording and storing data concerning credit cards and credit card holders. At the company site, and/or preferably at any bank or other institution where credit cards are issued, one or more cameras and other per se known installations 6 are located, for creating an electronically reproducible image of each authorized credit card holder. Such an image may be constituted by a picture of the holder's face, a portion thereof, or any other biometric visual data, in any desired disposition or dispositions, e.g., front and/or side views. Hence, the term "image" as used herein is meant to include all such features of the credit card holder, and/or any other visual indicia associated with that person. The installations 6 communicate with the company's credit card data storage and communication unit 4 via communication lines 8 or wirelessly, in accordance with available technology.

At the goods and/or services purchase sites, e.g., stores, garages, restaurants, etc., there are located credit card readers 10 and adjacent image display means 12, such as a display screen, a printer, or the like. The readers 10 and display means 12 communicate via lines 14, or wirelessly, with unit 4. Upon request, or automatically upon activation of the reader 10, the image of the registered credit card holder as entered and stored in unit 4, is displayed on image display means 12. Hence, in addition to credit availability and clearance which is presently effected by operating a credit card reader, the operator will benefit from verification of the true identity of the credit card holder by visually comparing the image displayed with the person presenting the credit card. If the two are identical or similar, the transaction will be completed.

Figure 2:
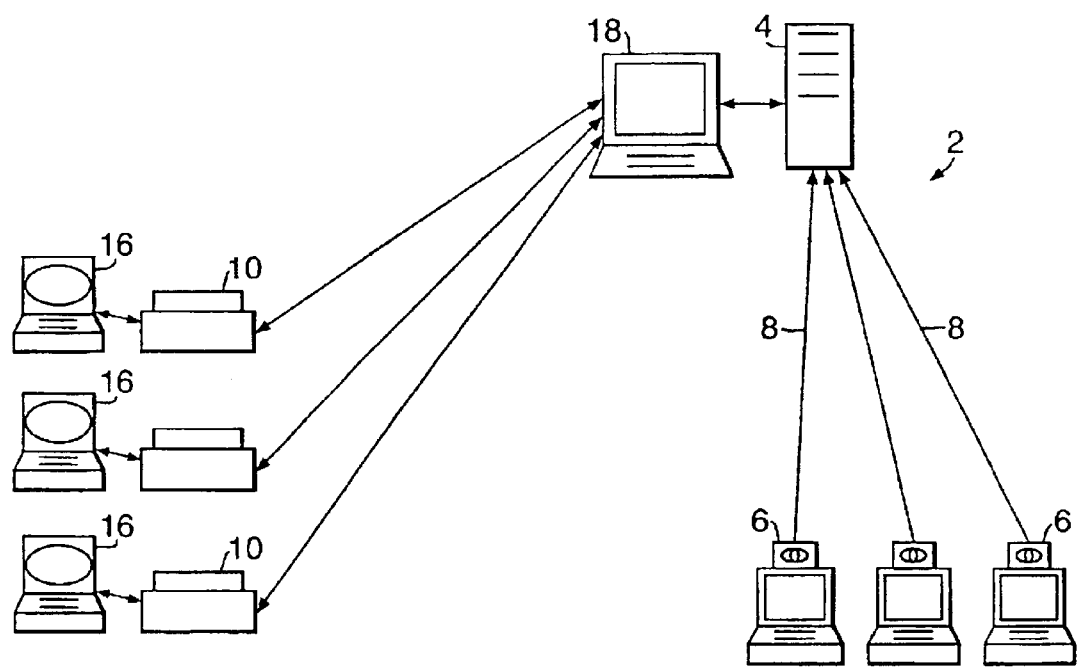

A modification of the above-described system is shown in FIG. 2. Accordingly, instead of providing display means 12 at each and every purchasing site, it is possible to replace the screen with a camera 16 for obtaining the customer's image, transferring it to one or more display screens 18 located at the company's control center. With such a system, the verification of the customer's identity is effected at the credit card company, where the company's operator compares the image displayed on the company's screen with the stored image. If the images match, the company is the one to grant the credit by certifying the completion of the transaction. Camera 16 may take the picture of the credit card holder and transfer it to the company's screen 18, or it may transfer the credit card holder's picture embedded in the credit card for verification at the data storage unit 4, either with or without utilizing the screen 18.

In order to deter salespersons from neglecting to properly compare the visual data at a sale payment location, a control method has been devised. As seen in FIG. 3, the data displayed to the salesperson on screen 18 will contain at least one additional, similar image or indicia, e.g., the image of a different person, and the salesperson will have to select the correct image or indicia from the display. Failure of the salesperson to select the right image or indicia will result in denial of the transaction, coupled with other deterrent means, such as delay in resuming operation of the payment terminal, the requirement of intervention by a local supervisor, release by a control function of the credit company, prolonged subsequent verification checks, or the like.

The failure statistics of a specific sales clerk or payment location may further be monitored in real time or gathered by the credit company, in order to enable control over a negligent workforce or organization, or in order to enable the credit company to reward the better performers.

It is noted that the verification supervisory control method, which is an essential part of the present invention, may be further applied to other card holder data, or, alternatively, may be applied when biometric visual data comparison is not enabled or not required for any reason. According to the present invention, any data or partial data associated with the card holder, such as a sample signature, expiry or birth date, may be displayed together with one more such similar data. The payment collector is required to perform the selection of the true data from the choice of data displayed. Failure to choose the correct data will result in the denial of credit and at least one punitive action, and may further be used by the credit company to monitor the verification performance of payment collectors.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for verifying the identity of a credit card holder effecting a transaction, comprising:

introducing data and a pre-recorded first image relating to each authorized credit card holder into a credit card company's remote data storage and communication unit or remote image display means;

providing at least one credit card reader and a camera at a local purchasing location for effecting communication with said remote data storage unit or remote image display means;

operating said credit card reader and camera to effect display of the credit card holder's image and data as a second image on a local image display means;

comparing the displayed second image with the stored first image of the card holder, and if the images are identical or similar, then approving the transaction.

2. The method as claimed in claim 1, wherein said camera is operated to photograph the credit card holder and to communicate the picture to said remote data storage unit or remote image display means.

3. The method as claimed in claim 1, wherein said camera is also utilized to photograph the image of the credit card holder embedded in the credit card and to communicate the picture to said data storage unit or image display means.

4. A method enabling credit companies to monitor and verify credit card holder identity when a payment transaction is performed by an operator at a sales terminal, said method comprising:

introducing images of identification data in a credit card company's data storage and communication unit;

displaying to the operator at said sales terminal multiple images of identification data, at least one of which is true;

prompting the payment terminal operator to view said data and select the correct data;

determining in said storage and communication unit whether the selected data is correct, and either completing or denying the transaction.

* * * * *